(12) United States Patent
De Luca

(10) Patent No.: US 11,470,690 B2
(45) Date of Patent: *Oct. 11, 2022

(54) ELECTRICAL ENERGY TRANSFER SYSTEM FOR A WIRE MESH HEATER

(71) Applicant: De Luca Oven Technologies, LLC, San Francisco, CA (US)

(72) Inventor: Nicholas P De Luca, Carmel-by-the-Sea, CA (US)

(73) Assignee: De Luca Oven Technologies, LLC

( * ) Notice: Subject to any disclaimer, the term of this patent is extended or adjusted under 35 U.S.C. 154(b) by 523 days.

This patent is subject to a terminal disclaimer.

(21) Appl. No.: 16/328,082

(22) PCT Filed: Aug. 31, 2017

(86) PCT No.: PCT/US2017/049652
§ 371 (c)(1),
(2) Date: Feb. 25, 2019

(87) PCT Pub. No.: WO2018/045190
PCT Pub. Date: Mar. 8, 2018

(65) Prior Publication Data
US 2019/0191492 A1    Jun. 20, 2019

Related U.S. Application Data

(60) Provisional application No. 62/381,557, filed on Aug. 30, 2016.

(51) Int. Cl.
*H05B 3/34*     (2006.01)
*A21B 1/22*     (2006.01)
*H05B 3/06*     (2006.01)

(52) U.S. Cl.
CPC .................. *H05B 3/34* (2013.01); *A21B 1/22* (2013.01); *H05B 3/06* (2013.01); *H05B 2203/016* (2013.01)

(58) Field of Classification Search
CPC .......... H05B 3/34; H05B 3/0076; H05B 3/24; H05B 3/347; H05B 3/56; H05B 3/565;
(Continued)

(56) References Cited

U.S. PATENT DOCUMENTS 3,866,016 A    2/1975 Tombu
4,581,522 A    4/1986 Graham
(Continued)

FOREIGN PATENT DOCUMENTS

GB    2484980 A    5/2012
WO    2016115215 A1    7/2016

OTHER PUBLICATIONS

International search report for PCT Patent Application No. PCT/US2017/049652.

*Primary Examiner* — Shawntina T Fuqua
(74) *Attorney, Agent, or Firm* — Capitol City TechLaw; Jasbir Singh

(57) ABSTRACT

The present teachings disclose a wire mesh heater including: a wire mesh element having a surface area comprising a non-contact area and a contact area; a primary conductor having a hollow and a contact surface; and a secondary conductor including a configured to expand outwards. The contact area contacts the contact surface to provide an electrical connection between the wire mesh element and the primary conductor, and the primary conductor is disposed about the secondary conductor and secured to the secondary conductor when expanded.

20 Claims, 4 Drawing Sheets

(58) Field of Classification Search
CPC .... H05B 3/06; H05B 6/6408; H05B 2203/07; H05B 2203/011; H05B 2203/014; H05B 2203/016; H05B 2203/032; H05B 2203/005; H05B 2203/026; H05B 2203/035; F24C 7/043; F24C 7/065; F24C 7/088; F24C 7/081; A21B 1/22

See application file for complete search history.

(56) References Cited

U.S. PATENT DOCUMENTS 6,181,874 B1   1/2001   Ireland et al.
10,798,784 B2 * 10/2020   De Luca ................. H05B 3/34

* cited by examiner

ELECTRICAL ENERGY TRANSFER SYSTEM FOR A WIRE MESH HEATER

CROSS REFERENCE TO RELATED APPLICATIONS

The present application is a 371 of International Patent Application No. PCT/US2017/049652 filed Aug. 31, 2017, which claims the benefit of U.S. Provisional Application No. 62/381,557, filed Aug. 30, 2016, all of which are incorporated in their entirety by reference for all purposes as if fully set forth herein.

FIELD

The present disclosure teaches a wire mesh energy transfer system that enables an uninterrupted or long term consecutive heating of a wire mesh for use in high speed heating applications. In particular, the system includes a primary conductor including a wire mesh tightening device such that a secondary conductor connected to a wire mesh heater and disposed about the primary conductor allows for the efficient transfer of electrical energy to the electrode and from there to the wire mesh heater.

BACKGROUND

A strong and stable electrical connection to the wire mesh is needed to provide even heating in the radiant oven. Without limitation, the stable or uniform electrical connection may extend the life of the wire mesh heating element. When an electrical connection to the element is not uniform, for example, when contact pressure between the wire mesh element holder and the wire mesh element is uneven, then the electrical current tends to travel through or concentrates in the contact area where the contact pressure is better. As such, the concentrated area of contact pressure becomes hotter than the remaining area of the wire mesh element or the wire mesh element holder, and a failure point is created. The use of materials that are both strong at high temperatures, but are also electrically conductive is a difficult match to achieve at a reasonable price point. Many such materials, for example, aluminum, also melt well below the operating temperature of the wire mesh element.

Tensioning of a wire mesh heating element is also more difficult than the tensioning of a single wire strand as the expansion and contraction of the element can vary if the heating is uneven or the mesh is oriented in such a fashion that the mesh creates zones of greater expansion. The high rate cycling of the mesh further increases the probability of a mesh failure with an unevenly tensioned mesh. The use of a warped element in the heating or cooking chamber can cause uneven heating or cooking of the item.

In the prior art, changing wire mesh heating elements is difficult, however, it is needed for many commercial ovens. The use of fasteners that are tightened to a precise torque value is often difficult to achieve in the field, for example, at restaurants, where a lack of necessary training may be found.

SUMMARY

The present teachings provide embodiments of heating system and methods, and features thereof, which offer various benefits. The system can employ multiple electrodes, systems, operations, and the like to promote safe, efficient, and effective use of the devices and methods disclosed herein.

The present teachings disclose a wire mesh heater including: a wire mesh element having a surface area comprising a non-contact area and a contact area; a primary conductor having a hollow and a contact surface; and a secondary conductor configured to expand outwards. The contact area contacts the contact surface to provide an electrical connection between the wire mesh element and the primary conductor, and the primary conductor is disposed about the secondary conductor and secured to the secondary conductor when expanded.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention, and together with the description serve to explain the principles of the invention.

Figure 1A:
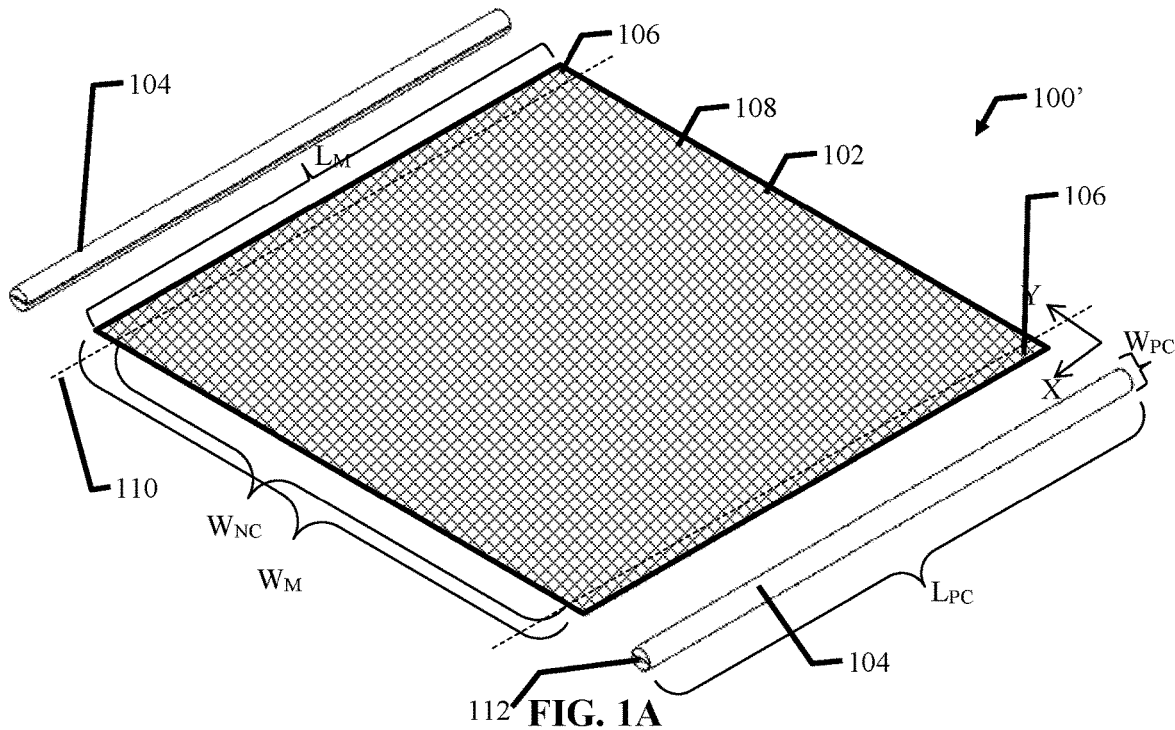
FIG. 1A is an isometric view of an unassembled wire mesh heater including a wire mesh element and a primary conductor according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION

The present teachings disclose efficiently transferring electrical energy to a wire mesh heating element. In exemplary embodiments, the transfer is evenly distributed over a breadth or length of the wire mesh. This may reduce the stress induced in the wire mesh, and reduce the heat being generated during the electrical energy transfer. The present teachings may evenly distribute any heat being generated during the electrical energy transfer. By reducing the heating and/or more evenly distributing the heat, the mean time between failures of the wire mesh heater may be increased.

The present teachings disclose a heating element system able to operate semi-continuously or continuously at high temperatures. The present teachings also disclose constant tensioning of a wire mesh heating element during use so that the element as a whole remains flat. The present teachings also disclose a wire mesh heating element that can operate in a heating cavity in a semi-continuous or continuous mode and that can be replaced easily.

In exemplary embodiments, a wire mesh heating assembly may include a primary conductor directly attached to the wire mesh heating element, and a secondary conductor or holder to secure the primary conductor through which the electrical current can flow. In some embodiments, the primary conductor may include a primary conduction rod or electrode.

According to various embodiments, the primary conductor may be continuous or fully or partially segmented. The primary conductor may contact a length of the wire mesh element.

The secondary conductor may tension, stretch or keep taut the wire mesh heating element in operation. In some embodiments, the secondary conductor may provide an adjustable tension for the wire mesh heating element in operation. The secondary conductor may include multiple tension points, a heat shield protection, and a latch or the like to provide ease of gripping and release of the primary conductor.

In exemplary embodiments, a flexible or movable electrical connection may connect an electrical energy source to the primary conductor. The flexible or movable electrical connection may include a stranded wire or telescoping nested tubes attached to the secondary conductor.

FIG. 1A is an isometric view of an unassembled wire mesh heater including a wire mesh element and a primary conductor according to various embodiments. An unassembled wire mesh heater 100' may include a wire mesh element 102 and a primary conductor 104. The wire mesh element 102 may have a length $L_M$, for example, along an X-axis. The wire mesh element 102 may have a width $W_M$, for example, along a Y-axis. The wire mesh element 102 may be planar. The wire mesh element 102 may be planar after application of a force or tension along the X-axis and the Y-axis. A surface of the wire mesh element 102 may be divided into a contact area 106 and a non-contact area 108. The non-contact area 108 may include a majority of the surface of the wire mesh element 102. The contact area 106 may be separated from the non-contact area 108 by an imaginary axis 110. The non-contact area 108 may have a width $W_{NC}$ that is smaller than the width $W_M$ of the wire mesh element 102. The non-contact area 108 may be adjacent to the contact area 106. In some embodiments, the non-contact area 108 may be surrounded by two contact areas 106. The primary conductor 104 may have a length $L_{PC}$ and a width $W_{PC}$.

Figure 1B:
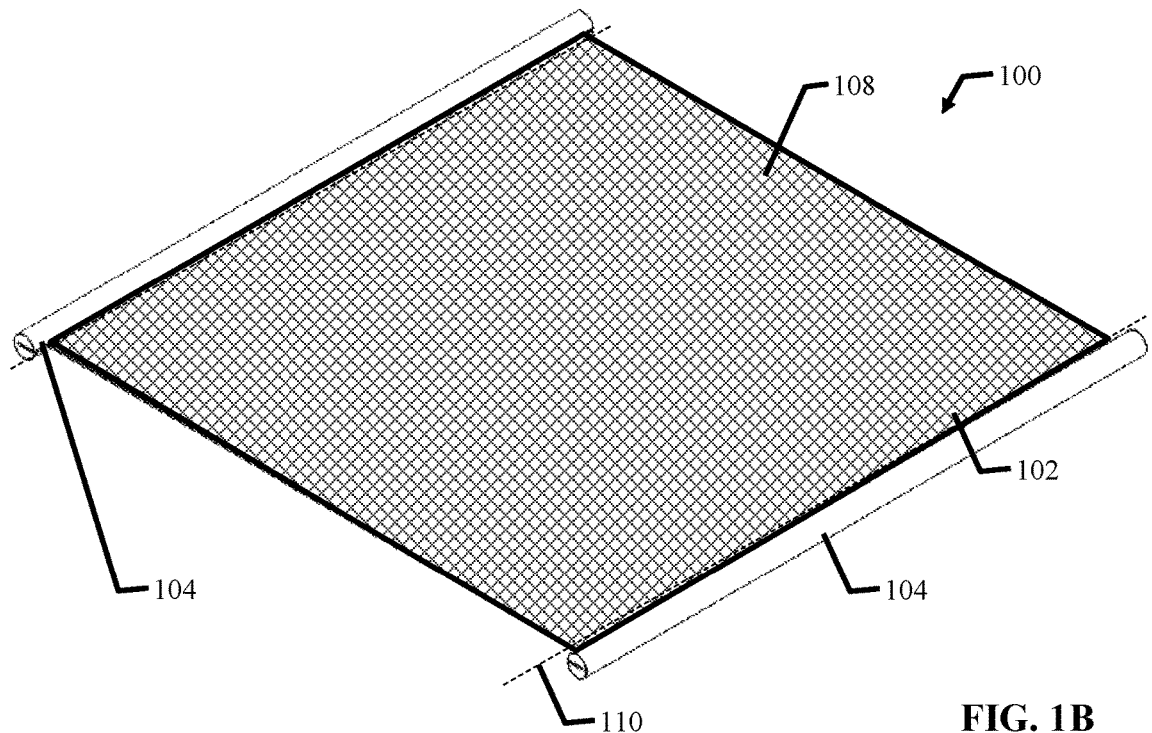
FIG. 1B is an isometric view of an assembled wire mesh heater including a wire mesh element and a primary conductor according to various embodiments.

FIG. 1B is an isometric view of an assembled wire mesh heater including a wire mesh element and a primary conductor according to various embodiments. An assembled wire mesh heater 100 may include the wire mesh element 102 and the primary conductor 104.

In some embodiments, the primary conductor 104 may optionally include a slit 112 as shown in FIG. 1A. The slit 112 may run along the whole $W_{PC}$ or a portion thereof. The slit 112 may run along the whole $L_{PC}$ or a portion thereof. In some embodiments, the length $L_{PC}$ may be greater than or equal to the length $L_M$. In some embodiments of the assembled wire mesh heater 100, the contact area 106 of FIG. 1A maybe secured in the slit 112 along the imaginary axis 110. The securing of the wire mesh heater 100 in the slit 112 may be bonded with a press. In some embodiments, the assembled wire mesh heater 100 is formed by assembling the unassembled wire mesh heater 100' of FIG. 1A.

In exemplary embodiments, the primary conductor 104 may not include the slit 112. The contact area 106 of FIG. 1A may be secured to the primary conductor 104 along the imaginary axis 110. The contact area 106 of the wire mesh element 102 may be secured to the primary conductor 104 by a solder, swage or weld. In some embodiments, the assembled wire mesh heater 100 is formed by assembling the unassembled wire mesh heater 100' of FIG. 1A.

In exemplary embodiments, the primary conductor 104 may not include the slit 112 and the contact area 106 of the wire mesh element 102 may be secured to the primary conductor 104 by mechanical means like clamps, screws, or crimping. In some embodiments, the primary conductor 104 be formed/extruded with crimps thereupon.

Figure 1C:
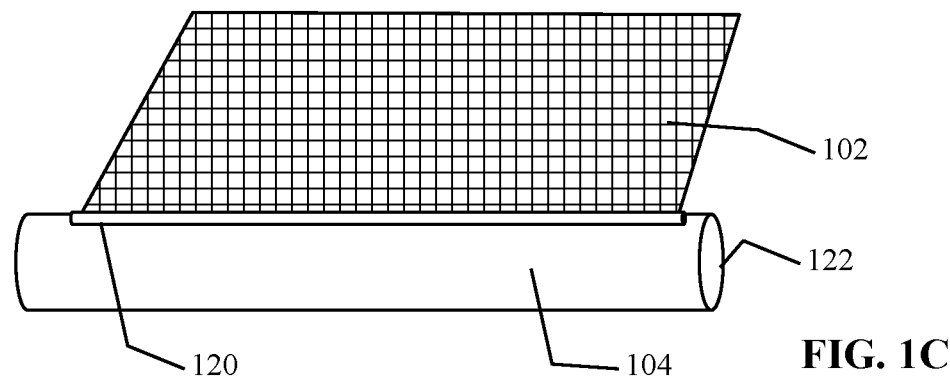
FIG. 1C is an isometric view of a wire mesh element and a primary conductor according to various embodiments.

FIG. 1C is an isometric view of a wire mesh element and a primary conductor according to various embodiments.

As shown in FIG. 1C, in some embodiments, the primary conductor 104 can be hollow or in other words, a sleeve made of metal. The sleeve 104 may be formed from a metal sheet. The metal sheet for the sleeve 104 may be formed as a cylinder. When the primary conductor 104 is a sleeve, a secondary conductor (not shown) may be disposed inside a hollow 122 of the primary conductor 104. Electrical connections to energize the wire mesh element 102 may be made to the secondary conductor. At least a portion of the secondary conductor may be able to expand its outer periphery, such that at least a portion of the secondary conductor forms a good electrical contact with the primary conductor 104 disposed about the secondary conductor.

Figure 2A:
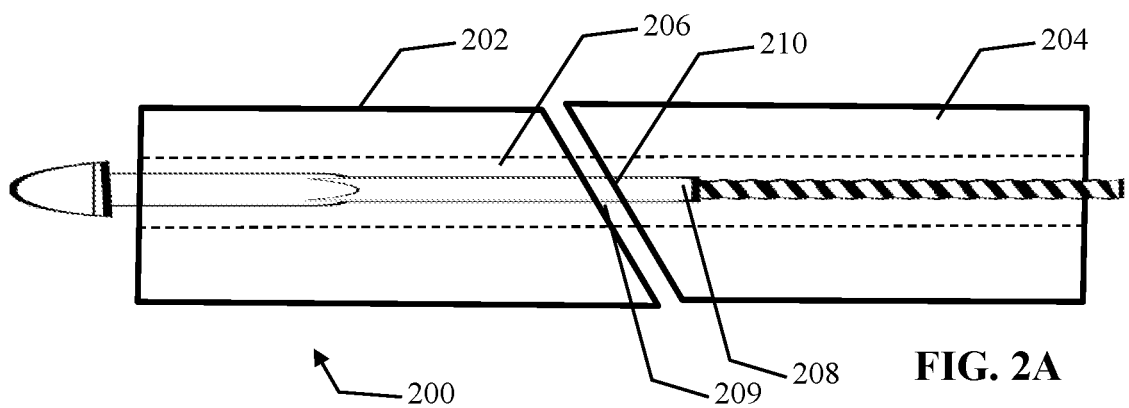
FIG. 2A is an isometric view of a secondary conductor according to various embodiments.

FIG. 2A is an isometric view of a secondary conductor according to various embodiments.

A secondary conductor 200 may include a first block 202 disposed opposite a second block 204 including a bias surface 210, a tightening rod 208 and a nut (not shown). In some embodiments, the first block 202 may include a bias surface 209 that is complementary of the bias surface 210. The first block 202 and the second block 204 may include a thru hole 206 therein. The radius of the thru hole 206 may be larger than a radius of the tightening rod 208. Upon tightening of the tightening rod 208, the first block 202 and the second block 204 may push or expand outwards along the bias surface 210.

Figure 2B:
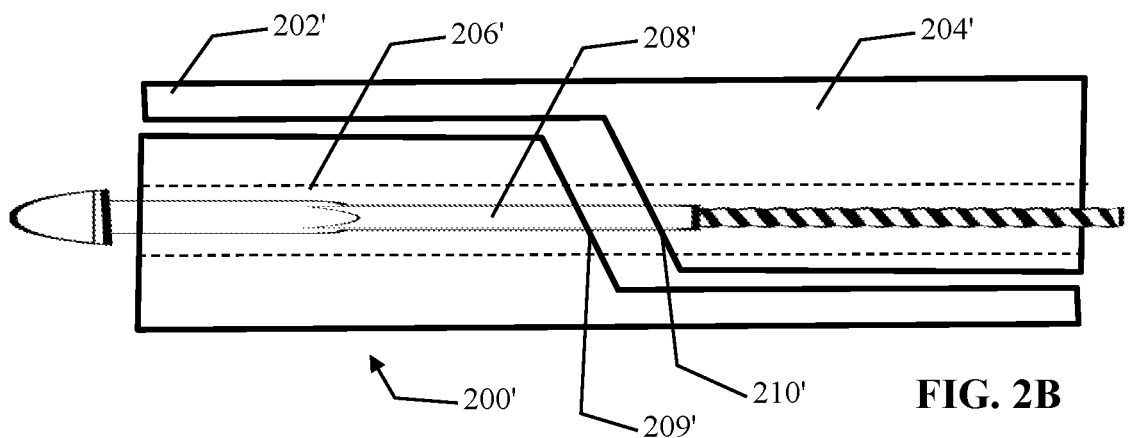
FIG. 2B is an isometric view of a secondary conductor according to various embodiments.

FIG. 2B is an isometric view of a secondary conductor according to various embodiments.

A secondary conductor 200' may include a first block 202' disposed opposite a second block 204' including a bias surface 210', a tightening rod 208' and a nut (not shown). The first block 202' and the second block 204' may include a thru hole 206' therein. In some embodiments, the first block 202' may include a bias surface 209' that is complementary of the bias surface 210'. The radius of the thru hole 206' may be larger than a radius of the tightening rod 208'. Upon tightening of the tightening rod 208', the first block 202' and the second block 204' may push or expand outwards along the bias surface 210'.

Figure 3A:
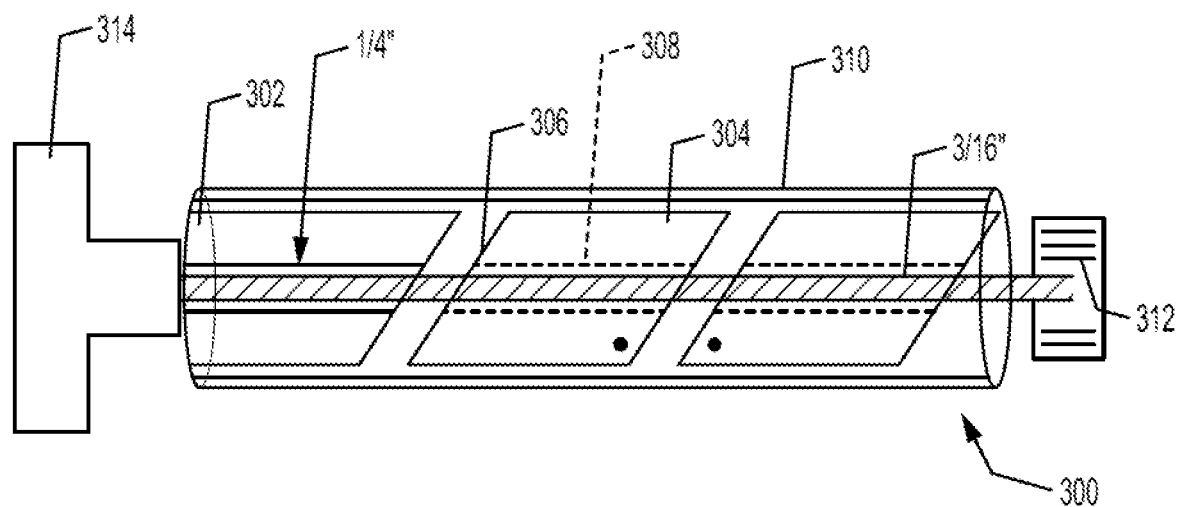
FIG. 3A is a partial isometric view of a wire mesh heater assembly including a primary conductor and a secondary conductor according to various embodiments.

FIG. 3A is a partial isometric view of a wire mesh heater assembly including a primary conductor and a secondary conductor according to various embodiments.

A wire mesh heater assembly 300 may include a primary conductor 310 and a secondary conductor, a tightening rod 308, a thru hole 306, a nut 312, and a wire mesh heater assembly support 314. A wire mesh element (not shown) is secured to the primary conductor 310. The secondary conductor may be formed with a first block 302 and a second block 308. In some embodiments, more than two blocks may be used to form a secondary conductor. The nut 312 may be a nut that is amenable to hand tightening. The nut 312 may include a knurled knob.

Figure 3B:
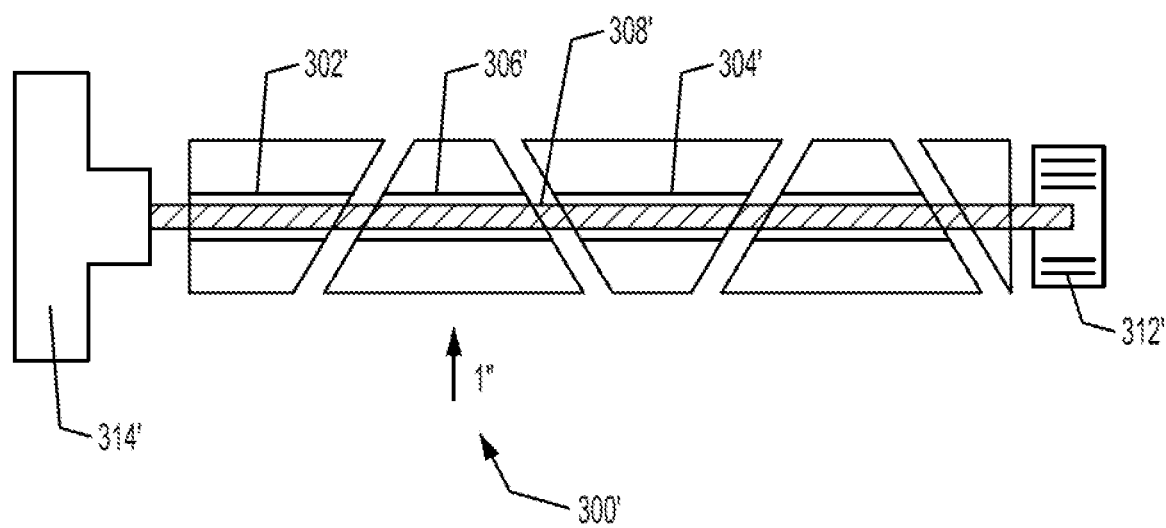
FIG. 3B is a partial isometric view of a wire mesh heater assembly including a primary conductor and a secondary conductor according to various embodiments.

FIG. 3B is a partial isometric view of a wire mesh heater assembly including a primary conductor and a secondary conductor according to various embodiments.

A wire mesh heater assembly 300' may include a primary conductor 310', a secondary conductor, a tightening rod 308', a thru hole 306', a nut 312', and a wire mesh heater assembly support 314'. A wire mesh element (not shown) is secured to the primary conductor 310'. The secondary conductor may be formed with a first block 302' and a second block 308'. In some embodiments, more than two blocks may be used to form a secondary conductor. The nut 312' may be a nut amenable to hand tightening. The nut 312' may include a knurled knob.

In exemplary embodiments, the secondary conductor may be formed as a quill stem including a tightening rod and nut disposed therein.

In exemplary embodiments, a wire mesh heater assembly may include a secondary conductor including a tightening rod and a fixedly-held secondary conductor that may or may not include a tightening rod.

In exemplary embodiments, the power cables can be connected to either the tightening rod or at a location other than the tightening rod on the secondary conductor. In exemplary embodiments, the electrical connection may occur at each block section along the length of the secondary conductor. In some embodiments, the electrical power may be brought to a central block when more than two blocks are used for the secondary conductor.

In exemplary embodiments, a primary conductor may have two meshes secured to the primary conductor. The two meshes may be secured on opposite sides of the primary conductor, e.g., one mesh heating a cavity above (or left of) the conductor assembly and one mesh heating a cavity below (or right of) the conductor assembly. In some embodiment, a heat shield may be disposed between the meshes.

Figure 4:
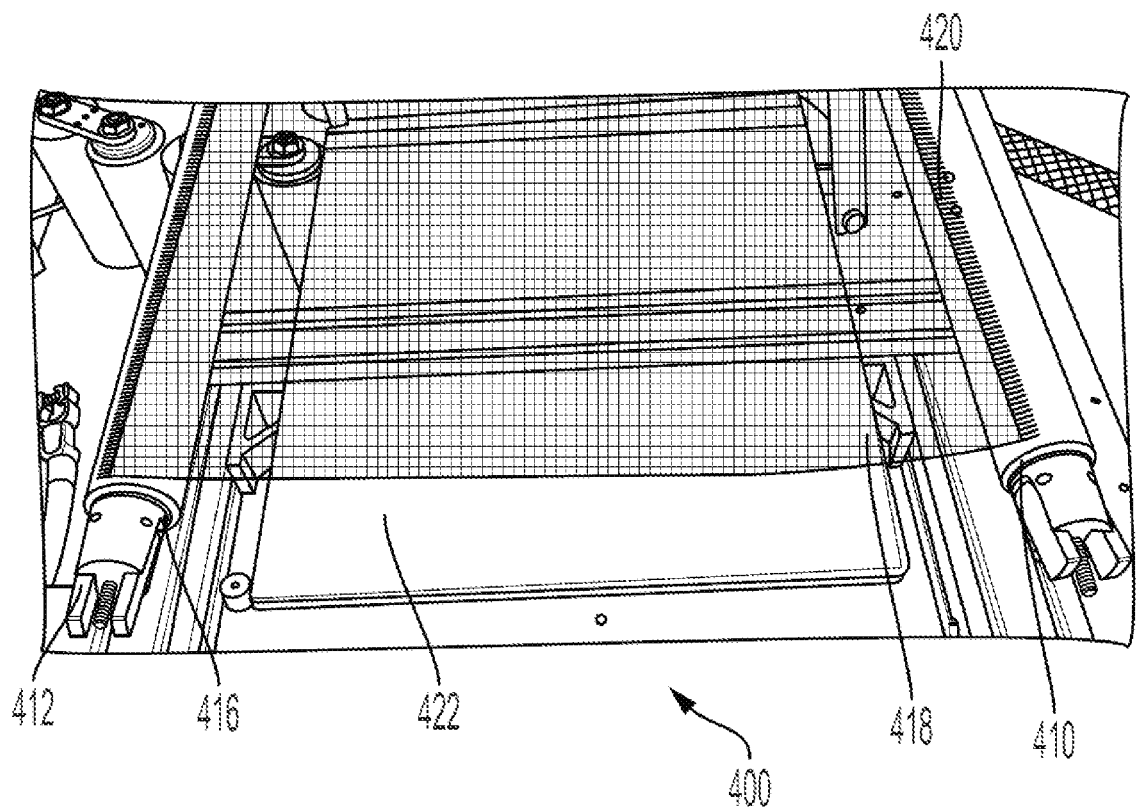
FIG. 4 is a top down of a wire mesh heater assembly according to various embodiments.

FIG. 4 is a top down of a wire mesh heater assembly according to various embodiments.

A wire mesh heater assembly 400 may include a primary conductor 410, a tightening rod (not shown), a thru hole (not shown), a nut 412 and a wire mesh heater 418 secured to the primary conductor 410 via a weld 420. The wire mesh element 418 is secured to the primary conductor 410. The nut 412 may be a nut amenable to hand tightening. The nut 412 may include a knurled knob. In some embodiments, the wire mesh heater assembly 400 may include a heat shield 422.

In some embodiments, two secondary conductors including two tightening rods may be used to form a wire mesh heater assembly. Two primary conductors secured to opposite edges of a wire mesh element may be disposed on the two secondary conductors. In some embodiments, the two tightening rods may be oppositely threaded, i.e., a first tightening rod may be threaded clockwise and a second tightening rod may be threaded counter-clockwise.

After installation, when a wire mesh heater assembly is disposed in the wire mesh heater a tightening of the nut may add tension to the wire mesh element to keep it taut and to eliminate hot spots in the wire mesh element.

Although, FIG. 4 illustrates the wire mesh element is disposed at the top of the sleeve/primary conductor, the wire mesh element may be disposed at anywhere on the sleeve/primary conductor.

In some embodiments, the primary or secondary can include an indicator to indicate that the proper tension has been applied through rotating the tightening nut. In some embodiments, the wire mesh heater can include an indicator to indicate that the proper tension has been applied through rotating the tightening nut.

When a secondary conductor is expanded to tighten so that the secondary conductor tightens about the primary conductor, if the sleeve/primary conductor turns the wire mesh element can mesh overlap itself on the sleeve/primary conductor. The overlap should be avoided to prevents a formation of "hot spots" that result in uneven heating.

In some embodiments, the tightening rod may be formed with tungsten or steel. In some embodiments, the conductive blocks (secondary) may be formed with of copper or aluminum (generally nickel-plated). In exemplary embodiments, the conductive blocks may be formed from standard aluminum rods. In some embodiments, the sleeve/primary conductor to which the wire mesh element is secured may be formed from 304 stainless.

The examples presented herein are intended to illustrate potential and specific implementations. It can be appreciated that the examples are intended primarily for purposes of illustration for those skilled in the art. The diagrams depicted herein are provided by way of example. There can be variations to these diagrams or the operations described herein without departing from the spirit of the invention. For instance, in certain cases, method steps or operations can be performed in differing order, or operations can be added, deleted or modified.

I claim:

1. A wire mesh heater comprising:
   a wire mesh element having a surface area comprising a non-contact area and a contact area;
   a primary conductor which is hollow and has a contact surface; and
   a secondary conductor configured to expand outwards,
   wherein the contact area contacts the contact surface to provide an electrical connection between the wire mesh element and the primary conductor, and the primary conductor is disposed about the secondary conductor and secured to the secondary conductor when the secondary conductor is expanded outwards.

2. The wire mesh heater of claim 1, wherein the contact area of the wire mesh element is welded to the primary conductor.

3. The wire mesh heater of claim 1, wherein the secondary conductor includes a void with a tightening rod disposed in the void, and the secondary conductor expands outwards by tightening the tightening rod with a nut.

4. The wire mesh heater of claim 1, wherein the secondary conductor includes a void with a tightening rod disposed in the void, a plurality of blocks having complementary bias surfaces, and the secondary conductor expands outwards by tightening the tightening rod with a nut.

5. The wire mesh heater of claim 1, wherein the secondary conductor includes a quill stem including a tightening rod and nut disposed on the tightening rod, and the secondary conductor expands outwards by tightening the tightening rod with the nut.

6. The wire mesh heater of claim 1, further comprising:
   a heating cavity comprising a first surface defined by the non-contact area of the wire mesh element; and
   a heat shield disposed in the heating cavity,
   wherein the heat shield is disposed adjacent to the primary conductor to reflect a majority of heat radiation generated by the non-contact area away from the primary conductor.

7. The wire mesh heater of claim 1, further comprising:
a Direct Current (DC) power supply; and
a braided electrical cable to electrically connect the DC power supply with the secondary conductor.

8. The wire mesh heater of claim 1, wherein the secondary conductor is partially segmented.

9. The wire mesh heater of claim 1, further comprising:
a chassis to secure the secondary conductor.

10. The wire mesh heater of claim 9, further comprising:
a Direct Current (DC) power supply; and
a braided electrical cable to electrically connect the DC power supply with the secondary conductor to electrically connect the DC power supply with the primary conductor.

11. The wire mesh heater of claim 9, further comprising:
a heating cavity comprising a first surface defined by the non-contact area of the wire mesh element; and
a heat shield disposed in the heating cavity,
wherein the heat shield is disposed adjacent to the primary conductor to reflect a majority of heat radiation generated by the non-contact area away from the primary conductor.

12. The wire mesh heater of claim 9, further comprising tension springs disposed between the primary conductor and the secondary conductor.

13. The wire mesh heater of claim 9, further comprising:
a heating cavity comprising a first surface defined by the non-contact area of the wire mesh element; and
a first heat shield disposed in the heating cavity disposed adjacent to the primary conductor to reflect a majority of heat radiation generated by the non-contact area away from the primary conductor.

14. The wire mesh heater of claim 1, wherein the primary conductor is partially segmented.

15. The wire mesh heater of claim 1, wherein the primary conductor comprises a sleeve coated with a heat-resistant alloy.

16. The wire mesh heater of claim 1, wherein the non-contact area of the wire mesh element comprises an edge area that is angled with respect to a non-edge area of the non-contact area of the wire mesh element.

17. The wire mesh heater of claim 1, wherein the primary conductor comprises a non-contact surface covered by an electrical insulator.

18. The wire mesh heater of claim 17, wherein the electrical insulator has a thickness of at least 0.03 inches and the electrical insulator comprises an insulative paint or a ceramic coating.

19. The wire mesh heater of claim 1, wherein the secondary conductor comprises a metal rod coated with a heat-resistant alloy.

20. The wire mesh heater of claim 1, wherein the contact area is disposed along at least 50% of a wire mesh element length.

* * * * *